Figure 1:
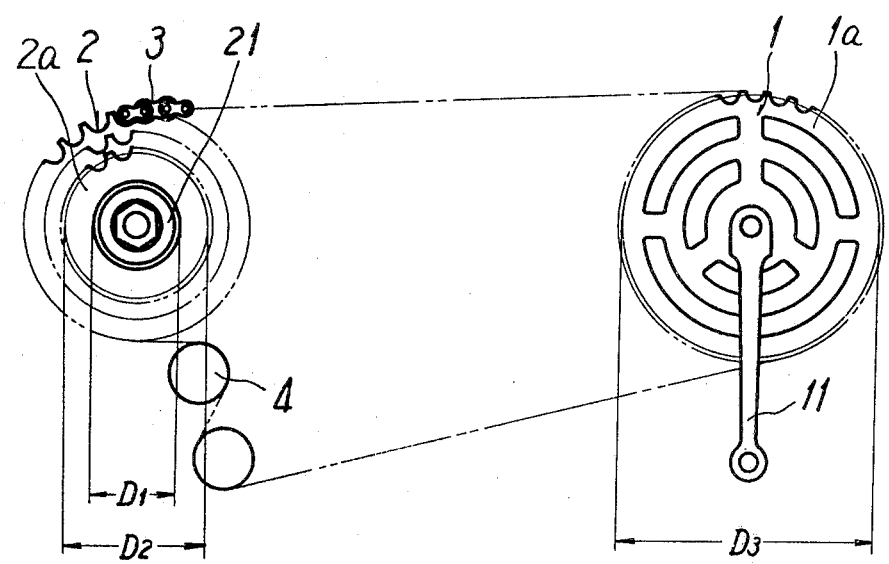

United States Patent [19]

Shimano

[11] 4,018,095
[45] Apr. 19, 1977

[54] DRIVING DEVICE FOR BICYCLE
[75] Inventor: Keizo Shimano, Sakai, Japan
[73] Assignee: Shimano Industrial Company Limited, Osaka, Japan
[22] Filed: Mar. 29, 1976
[21] Appl. No.: 671,705

[30] Foreign Application Priority Data
June 6, 1975 Japan .............................. 50-73488
June 6, 1975 Japan .............................. 50-73490
June 6, 1975 Japan .............................. 50-73489

[52] U.S. Cl. ........................... 74/217 B; 74/243 R
[51] Int. Cl. ........................................ F16h 55/30
[58] Field of Search ...... 74/217 B, 243 R, 243 DR, 74/245 R

[56] References Cited
UNITED STATES PATENTS 3,661,021  5/1972  Ohshita ........................... 74/217 B
3,709,053  1/1973  Ohshita ........................... 74/217 B Primary Examiner—Samuel Scott
Assistant Examiner—Allan R. Burke
Attorney, Agent, or Firm—Stevens, Davis, Miller & Mosher

[57] ABSTRACT

A driving device for a bicycle comprises a front gear mounted to a crank, a rear gear mounted to a rear hub, and a driving chain maintained under pressure across both the front and rear gears, both the gears comprising sprocket wheels having their tooth pitches less than 12.7mm respectively and the chain having its pitch equal to or being multiples of the tooth pitch. The pitch diameter of each sprocket with respect to the number of teeth on it is reduced to make the driving device lightweight, all accelerative, and greater in transmission ratio, and to reduce the difference between the pitch diameters of both gears even with the greater transmission ratio, so that the sprocket teeth may wear less as a result of chain contact.

5 Claims, 3 Drawing Figures

DRIVING DEVICE FOR BICYCLE

This invention relates to a driving device for a bicycle and more particularly to a driving devcie having a front gear comprising one or more sprockets mounted to a crank shaft, a rear gear comprising one or more sprockets mounted to a rear hub, and a driving chain stretched across both the front and rear gears.

Conventionally, front and rear gears and a drive chain, which build up a driving device for a bicycle, are, as in the Japanese Industrial Standard, rated of the pitch of 12.7mm (one half in.).

When both gears and the drive chain have the pitch of 12.7mm respectively, the pitch diameters of the gear are limited to 49 mm or more cannot be further reduced and the smallest rear gear is defined by its pitch diameter usually with 13 teeth, or at a minimum with 12 teeth, which are further reduced because of overstrain of the gear in mesh with the chain resulting in considerably poor transmission efficiency.

Accordingly, te minimum number of teeth restricts the pitch diameter of the gear to no less than 49 mm.

A greater transmission ratio of conventional front and rear gears requires a greater pitch diameter of the front gear, hence, first, the gears increase in weight against the present tendency to produce them as lightweight, as possible second, the greater ratio leads to enlarge the pitch diameter difference between both the front and rear gears as a result, a problem arises in that increased transmission torque at a reduced meshing portion of the rear gear with the chain makes/face stress greater to accelerate wear of the rear gear which is easily worn, and in that the front gear, of larger pitch diameter than the rear one, is occasionally subject to deflection or wobble in rotation of a crank shaft, resulting in a requirement for precise processing.

Furthermore, it is a serious problem for a racing bicycle because the larger the pitch diameter of the front gear, the greater the moment of inertia and the worse the acceleration in crank rotation.

In view of te abovementioned problem, this invention has been designed. A main object of the invention is the provision of a driving device for a bicycle, which device is capable lowering the limit of minimum pitch diameter, lightweight relative to a given transmission ratio, and less in running resistance but improved in acceleration. Another object of the invention is the provision of a driving device capable of increasing its transmission ratio without enlarging the pitch diameter of the gear. A further object of the invention is the provision of a driving device having the same transmission ratio as the conventional one and a reduced pitch diameter difference between the front and rear gears to enlarge the meshing portion of the rear gear with the chain thereby reducing the extent of wear at the rear gear. Still a further object of the invention is the provision of a driving device having drive chain which sufficiently leaves the gear teeth and is easily shiftable between the gears if the front and rear gears are multiplied thereby improving he transmission performance.

The conventional driving device is practically provided with a drive chain of 12.7 mm pitch, the chain being used as a matter of course so that the aforesaid problem has not been solved with such chain as a clue for solution.

This invention has been designed from the point of view that the aforesaid problems are solvable by making the pitch of the front and rear gears less than 12.7 mm.

A driving device for a bicycle in accordance with the invention is formed of: front and rear gears, which are composed of sprockets having teeth thereon with a pitch of less than 12.7 mm and mounted to a crank shaft and a rear gear respectively, among which sprockets, the one with the minimum number of teeth has a pitch diameter of less than 49 mm; and a drive chain maintained under pressure across both the front and rear gears and having, a pitch equal to or being multiples of the sprocket teeth pitch.

The above objects of the invention and others will be apparent from the following detailed description in accordance with the accompanying drawings.

Figure 2:
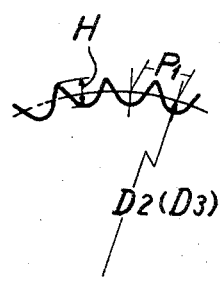
Figure 3:
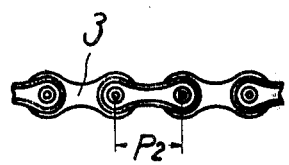

FIG. 1 is a schematic front view of a driving device of the invention,

FIG. 2 is a partially enlarged view of a sprocket of the driving device in FIG. 1, FIG. 3 is a partially enlarged view of a driving chain of the driving device in FIG. 1, Referring to FIG. 1, the driving device of the invention principally comprises; front gear designated with the reference numeral 1, comprising one or more sprockets 1a mounted to a gear crank 11; a rear gear designated with the reference numeral 2, comprising one or more sprockets 2a, mounted to a rear hub 21; and a driving chain designated with the reference numeral 3, pulled across both the front and rear gears. The sprockets 1a and 2a have the teeth with pitch $P_1$ of 8.5 to 11.5 mm, i.e., less than 12.7 mm (one half in.), the driving chain 3 has a pitch $P_2$ equal to or multiples of the pitch $P_1$ of the sprockets 1a and 2a, and pitch diameters $D_1$ and $D_2$ of the sprockets 1a and 2a at each of the front and rear gears are reduced respectively, so that the pitch diameter $D_1$ of the sprocket 2a with the minimum number of teeth is less than 49 mm. When the rear gears 2 are multiple free wheels, the pitch diameter $D_1$ of the smallest gear, top gear 2a, is less than 49 mm, and when the rear gear is a single stage freewheel or small for racing cycle, the pitch diameters of such gears are similarly less than 49 mm respecitvely. In FIG. 1, the reference numeral 4 denotes a derailler for a bicycle.

In greater detail, the pitch $P_1$ of the teeth of the sprockets 1a and 2a at the gears 1 and 2 is, for example, 9.525 mm (three eights in.) and the pitch diameter $D_1$ of the sprocket 2a with the minimum number of teeth at the rear gears 2 is, for example, 48.82, 45.81, 42.80, 39.80 or 36.80 mm, each less than 49 mm. These figures depend upon the the number of teeth. Now, the teeth number of corresponding to the pitch diameter $D_1$ in the present invention are shown in the following table:

| Pitch Diameter (mm) | 48.82 | 45.81 | 42.80 | 39.80 | 36.80 |
|---|---|---|---|---|---|
| Teeth Number (ps) | 16 | 15 | 14 | 13 | 12 | while, in a conventional device with a teeth pitch of 12.7mm:

| Pitch Diameter (mm) | 65.10 | 61.0 | 57.07 | 53.07 | 49.07 |
|---|---|---|---|---|---|
| Teeth Number (ps) | 16 | 15 | 14 | 13 | 12 |

As seen from the two tables, when the teeth pitch $P_1$ of the sprockets 1a and 2a of each of the gears 1 and 2 is 9.525 mm, i.e., less than 12.7 mm, the pitch diameter with respect to the number of teeth can be reduced by 25 % in comparison with the conventional device of the pitch of 12.7 mm so that the pitch diameter of the sprockets may be less than 49 mm, even though such reduction has hitherto been considered as impossible in the conventional one.

Thus, the teeth pitch of, for example 9.525 mm and the pitch diameter $D_1$ at the rear gear 2 of less than 49 mm, make the driving device of the invention very compact and light-weight in proportion to the transmission ratio, compared with the conventional device having the rear gear of 12 teeth and the given transmission ratio.

In case the rear gear 2 is formed with 12 teeth and the front gear 1 with 36, the former is reduced from 49.00 to 36.80 mm in pitch diameter and also the latter from 145.72 ot 109.29 mm, so that the pitch diameter of the rear gear, which hitherto could not be reduced less than 49 mm, may be reduced to that extent to be applied to the driving device, whereby the device entirely becomes compact, lightweight and improved in acceleration by lessening the moment inertia, and further increased, as aforesaid, in transmission ratio without a greater pitch diameter of the front gear 1.

When the driving device has the same number of teeth number as the conventional one, the pitch diameters $D_1$ and $D_2$ thereof can be reduced so that the front gear with a large number of, i.e., with 28 to 56 pieces, may especially be small-sized. Furthermore, if attached to a gear crank 11 equal in length to a conventional one, the driving device may highly be driven to result in use of a shorter gear crank 11.

Accordingly, the problem is solved that when a turn is made, the bicycle is free from striking the ground with its pedal even though it increases in its inclining angle. As a result, an optimum driving device for racecycles can be provided. In addition, since the reduction of the pitch diameter $D_1$ of the front gear 1 is more than that of the rear gear 1, the difference between both the pitch diameters is lessened in comparison with the conventional one so that the rear gear 2 may increase in meshing area thereof with the chain 3, resulting in less failure from wear of the abrasive rear gear.

In the aforesaid driving device, the pitch $P_1$ at the sprockets 1a and 2a is 9.525 mm, but it can be selected desirably from 8.5 mm to 11.5 mm as aforesaid, and it is logically possible for the pitch to be reduced less than 8.5 mm, but questionable for strength of the gear in practical use.

When the pitch $P_1$ is, as aforesaid, settled, the sprocket pitch diameter $D_1$ is reduced in reduction ratio compared with the conventional sprocket of tooth pitch of 12.7 mm, but its thickness is made equal to that of the conventional sprocket of 12.7 mm pitch. The sprocket is not entirely reduced in the ratio but in its pitch diameter $D_1$ and its tooth height H, where its thickness is not reduced. In greater detail, when the tooth pitch P1 is reduced by 4.2 through 1.2 mm from 12.7 mm to be, as the aforesaid, 8.5 mm to 11.5 mm, the pitch diameter $D_1$ with respect to the number of teeth and the height H are reduced with the reduction ratio and further the thickness is made larger in excess of the reduction ratio.

When the pitch $P_2$ of the chain 3 is, as aforesaid, 9.525 mm (three eights in.), the reduction ratio is 25 %, for example, when the front gear 1 of teeth thickness of 3.0 mm, pitch diameter of 113.43 mm and 28 teeth, and the rear gear 2 of teeth thickness of 3.0 mm, pitch diameter of 57.07 mm and 14 teeth, are employed to the driving device transmittable with about 1 to 2 transmission ratio, the pitch diameter $D_1$ of the front gear 1 is proportionally reduced by the reduction ratio to be 85.07 mm, and that $D_2$ of the rear gear 2 is similarly reduced to be 42.80 mm, the tooth thickness of the front gear 1 being 3.0 mm. In this instance, the tooth height is made smaller by the reduction ratio, namely, the height H more than 6 mm in the conventional sprocket, is reduced to less than 6 mm, preferably, to about 4.6 to 5.0 mm.

The reduction of the tooth height H can solve problems such as imperfect chain-leaving and bad transmitting function of the chain shift due to a larger difference between pitch diameters of two or more sprockets with different number of teeth when the rear gears 2 provide, for example, two or more sprockets for shifting the chain 3.

As clearly understood from the abovementioned description, since the tooth pitch of the sprockets at the front and rear gears is made less than 12.7 mm, preferably, to be from 8.5 to 11.5 mm, the sprockets of the invention can be reduced in pitch diameter by about 33 to 10 % in comparison with the conventional one of pitch diameter of 112.7 mm with respect to the number of teeth.

In the case that the pitch diameter of the sprocket with the minimum number of teeth at the rear gears is especially made to be less than 49 mm, and the number of teeth of the rear gears and the transmission ratio are not different from those of the conventional driving device, the driving device of the invention can as a whole be formed in a small sized. Accordingly, the device can be made lightweight so as to be inexpensive to manufacture as well as accord with the present tendency of reducing the weight, and further lessen the running resistance with the attendance of improving the acceleration.

In addition, when the pitch diameter of the minimum rear gear is made less than 49 mm, the transmission ratio of the driving device can be larger without enlarging the pitch diameter of the front gear. Also, when the front gear has the same teeth number as the conventional one, of which pitch diameter with respect to the teeth number is reduced more than reduction of the rear gear pitch diameter so that the difference between pitch diameters of both the front and rear gears may be reduced at the same transmission ratio as the conventional device. Hence, the drive chain can be meshed with more teeth of the abrasive rear gear so that the stress applied on one tooth face may be reduced to thereby lessen to that extent wear of the teeth.

Also, the driving device of the invention has the pitch the teeth less than 12.7 mm so that the teeth may have a height of less than 6 mm, 6mm being the height of the conventional one to result in that the chain can sufficiently leave the teeth, and when the device is combined with a derailleur the difference in pitch diameters of multiple speed-change gears can be reduced, whereby the device can remarkably improve the transmission function with attendance of improved shifting performance of the drive chain.

While an embodiment of the invention has been shown and described, the invention is not limited to the specific construction thereof, which is merely exemplified in the specification rather than defined.

What is claimed is:

1. A driving device for a bicycle, which comprises a front gear comprising one or more toothed sprockets mounted to a gear crank,
   a rear gear comprising one or more toothed sprockets mounted to a rear hub, and
   a driving chain stretched across said front and said rear gears,
   the teeth of te sprockets of the front gear and the rear gear have a pitch in the range of 8.5mm to 11.5mm respectively, and said driving chain having its pitch equal or multiples of said teeth pitch of the sprockets.

2. The driving device for the bicycle according to claim 1, wherein the sprocket with the mimimum number of teeth of said rear gear has a pitch diameter of less than 49 mm.

3. The driving device for the bicycle according to claim 1, wherein the pitch of the teeth of said sprockets of both the front and rear gears is reduced by a rate of 12.7 mm minus 4.2 through 1.2 mm; the pitch diameters of the front and rear gears, with respect to the number of teeth, are reduced by said reduction rate; and the thickness of the teeth of the sprockets of the front and rear gears are reduced not proportionally to but less than said reduction rate.

4. The driving device for a bicycle according to claim 1, wherein each of said sprockets is more than 3.0 mm in thickness.

5. The driving device for a bicycle according to claim 1, wherein the teeth of each of said sprockets are less than 6 mm in height.

* * * * *